Patented Oct. 13, 1925.

1,557,338

UNITED STATES PATENT OFFICE.

ROLAND RUNKEL, OF ROTTENBURG-ON-THE-NECKAR, GERMANY.

METHOD OF PRODUCING HALF STUFFS AND CELLULOSE.

No Drawing.   Application filed December 10, 1923. Serial No. 679,776.

*To all whom it may concern:*

Be it known that I, ROLAND RUNKEL, a citizen of Germany, residing at Rottenburg-on-the-Neckar, Wurttemberg, Germany, have invented certain new and useful Improvements in Methods of Producing Half Stuffs and Cellulose, of which the following is a specification.

In the method of producing cellulose made known in my application 642,665, filed May 31, 1923, the particular bodies of vegetable fibres are subjected to an alternating treatment by alkaline and chlorinating fluids, in which through the action of chlorine the lignines and incrusting constituents are converted into an alkali soluble form.

The method according to the present invention indicates a far-reaching improvement in the way of working hitherto, as the process is considerably shortened and can be carried out from beginning to end in one and the same bath.

Chemically the new method is based on the combination of a chlorinating process with an oxidation process, in which particular regard is given to the fact that certain chemicals in a nascent state exercise a particularly powerful action.

Vegetable fibres of any kind, even when largely lignified, are freed in a short time from lignous substances and incrustates and the cellulose released, so that for example a pure white cellulose, serviceable for purposes of all kinds can be obtained from wood-wool in 3 hours, from fine wood chips in 5 to 6 hours and from finely divided vegetable fibres, as peat, straw, reed, etc. in 1 to 1½ hours without the employment of pressure or artificial heating with the most economical expenditure of chemicals.

The method according to the present invention consists in this viz., that upon the introduction of chlorine gas into a diluted soda lye solution of 1 to 2 per cent in a moderate stream, the most varied products come into action on a body of vegetable fibres contained in one and the same vessel, all of which act simultaneously on the fibres in the direction of the removal of the incrustates. In this process the free chlorine gas penetrating into the solution exercises its particular lignine, chlorinating action, whilst the soda lye acts in the sense of dissolving the formed chlorination products. The hypochlorite of sodium gradually produced from the chlorine and soda lye exercises its oxidizing and leaching action by giving off oxygen in a nascent state. After some time this process comes so far to a standstill that the whole of the soda lye present is now converted into hypochlorite and the hypochlorite is exhausted, there being a formation of sodium chloride and free muriatic acid, whilst the continuous stream of chlorine proceeds with its incrustate-chlorinating action.

If this chlorination be further continued until a noticeable excess of chlorine in the solution becomes observable by the smell and soda lye be added again in the stated proportional percentage, the process begins afresh with its oxidizing, chlorinating, dissolving and bleaching action and in the second, up to the third repetition, the process is so far advanced that the fibrous mass which is present consists only of cellulose, which at the same time is so extensively bleached that any further treatment can be dispensed with.

This rapidly proceeding reaction is exothermic, which is observable by a slight heating of the reaction bath. With careful procedure the increase of temperature, which moreover may be prevented by water-cooling from outside, is in such moderate limits, that there is no attack on the fibres in respect of their strength nor any formation of hemicellulose (oxycellulose) beyond the normal degree.

The method can be employed for fibrous substances of any kind as for example peat and the fallen or refuse material of the woods, particularly in the treatment of wood, as well as to that of vegetable bast, for example of the hop and plants of the nettle order to form textile fabrics.

The special economical advantages consist in the rapidity with which the process proceeds and the saving in water and working power, which is due to the possibility of working from the beginning to the end in the same solution without washing out. Vegetable fibres which are previously treated in the same manner as described in my application 642,665 filed May 31, 1923 by the action of heat or frost in a condition thoroughly soaked with water, are susceptible in a high degree to the process according to the present invention, which is particularly expressed in a shortening of the process and in a small residue of branch wood and chips.

The method is explained by the following example:

50 gr. of finely divided chippings are placed in a 2 litre circular vessel containing soda lye of 1 to 2 per cent and vigorously stirred, a slow stream of chlorine being continuously introduced, until the liquid no longer shows any alkaline reaction and the appearance of chlorine gas is noticeable over the surface of the liquid. As soon as this condition is reached, soda lye or solid protoxide of sodium or soda is again added to the mass to such an extent that the fluid, calculated in water, would represent a lye containing 1 to 2 per cent. This addition of soda lye or other alkalies is periodically repeated until the reaction appears to be ended, that is to say until the liquid is only a thin liquid free from cellulose fibres. The final condition, in which in the interest of the degree of bleaching a slight alkalinity should still be present, is reached in general after 5 to 6 hours and leads to a pure solid fibrous product which is entirely free from lignine and poor in hemicellulose, and after removal of the branch and splinter residue present, can be worked up into cellulose pulp or paper.

In the case of certain fibrous plants, fibres for spinning can be obtained and in the case of many crude substances, as for example peat, if the step or stage process be prematurely broken off, a half stuff admirably suited for the manufacture of paper pulp can be obtained.

I claim:

1. A method of producing half stuffs and cellulose from vegetable fibres of any kind, including peat, for the manufacture of paper pulp and paper, the distinguishing feature being that the chemical action of chlorine and alkalies is carried out simultaneously, whereby with periodically repeated addition of alkali, the complete loosening of vegetable fibres of any kind as well as wood, in the form of chippings so as to form a pure white cellulose substance is rendered possible in a considerably shortened and simplified course of working.

2. Method according to claim 1, the distinguishing feature being that the simultaneous action of chlorine and alkalies is carried out by continuous introduction of chlorine into the alkaline solution.

3. A method of producing half stuffs and cellulose from vegetable fibres, comprising simultaneously subjecting the material to the action of chlorine and alkalies and repeatedly adding an alkali reagent to completely loosen the vegetable fibres and produce a pure white cellulose substance.

4. A method according to claim 3 in which the simultaneous action of the chlorine and alkalies is carried out by the continuous introduction of chlorine into the alkaline solution.

In testimony whereof I affix my signature.

ROLAND RUNKEL.